United States Patent Office 3,320,300
Patented May 16, 1967

3,320,300
BUTYL (BUTYLTHIO)THIOLACETATE, AND METHOD OF PREPARING THIOL ESTERS
Richard C. Doss, Bartlesville, Okla., assignor to Phillips Petroleum Company, a corporation of Delaware
No Drawing. Filed Oct. 26, 1964, Ser. No. 406,553
14 Claims. (Cl. 260—455)

This invention relates to a method of producing thiol esters. This invention also relates to the production of butyl (butylthio)thiolacetate.

Heretofore mercaptals and hemimercaptals of chloral have been produced by an acid-catalyzed, low temperature reaction of thiols with chloral.

Surprisingly, it has been found that a thiol ester having a sulfide linkage alpha to the ester group is produced by contacting a thiol with a compound selected from the group consisting of dihalo aldehydes and trihalo aldehydes including chloral if the contacting is carried out when the compound is a dihalo aldehyde at a temperature of from about 20 to about 300° C. and when the compound is a trihalo aldehyde at a temperature of from about 150 to about 300° C.

Although it is not completely understood and therefore it is not desired to be bound thereby, in the case of the dihalo aldehyde it appears that the reaction occurs by the following mechanism:

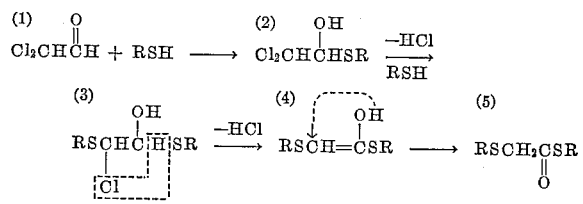

Quite unexpectedly, it appears from the above formula that only one chlorine atom in step (2) reacts with RSH thereby producing the intermediate of step (3). It also appears that from the intermediate of step (3) HCl is eliminated to produce the intermediate of step (4).

Although also not completely understood and therefore not desiring to be bound thereby, in the case of the trihalo aldehyde it appears that the reaction occurs by the following mechanism:

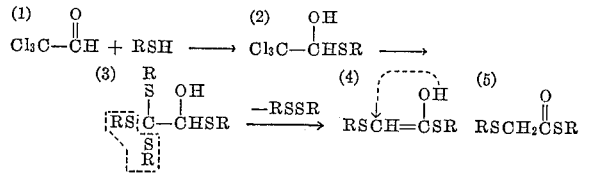

Quite unexpectedly, it appears from the above formula that in step (3) a disulfide molecule is eliminated to form the intermediate of step (4). The disulfide molecule remains as a by-product of the reaction, for example in Example I as butyl disulfide.

It has also been found that when the thiol employed is 1-butanethiol the product is a novel compound having the formula

and termed "butyl (butylthio)thiolacetate."

Accordingly, it is an object of this invention to provide a new and improved method of producing thiol esters. It is another object of this invention to produce butyl (butylthio)thiolacetate.

Other aspects, objects and the several advantages of the invention will be apparent to those skilled in the art from the description and the appended claims.

According to this invention, a thiol ester having a sulfide linkage alpha to the ester group, said thiol ester having the formula

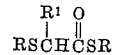

is prepared by the reaction of a thiol of the formula RSH with a polyhalo aldehyde of the formula $R^2CX_2CHO$, where X is a halogen selected from at least one of the group consisting of fluorine, chlorine, bromine, and iodine, preferably chlorine or bromine; R is a monovalent hydrocarbon radical containing from 1 to 18 carbon atoms, preferably from 1 to 6 carbon atoms, both inclusive, and selected from the group consisting of alkyl, cycloalkyl, alkenyl, cycloalkenyl, aryl, and combinations thereof, preferably alkyl; $R^1$ is a substituent selected from the group consisting of R and hydrogen; $R^2$ is a substituent selected from the group consisting of R, hydrogen, and X, preferably hydrogen, chlorine and bromine; and the total number of carbon atoms in the thiol ester molecule is not greater than 40, preferably not greater than 14. When $R^2$ is R or H then $R^1$ in the product will also be R or H, respectively. When $R^2$ is X then $R^1$ in the product will be H. If desired, the polyhalo aldehyde can be employed as a hydrate since the hydrates of these compounds are generally sufficiently stable to be used as a reactant.

As examples illustrative of the reaction, chloral (trichloroacetaldehyde) reacts with 2-propanethiol to give isopropyl (isopropylthio)thiolacetate and dibromoacetaldehyde reacts with o-toluenethiol to give o-tolyl (o-tolylthio) thiolacetate. Similarly, fluoral (trifluoroacetaldehyde) reacts with cyclohexanethiol to gvie cyclohexyl (cyclohexylthio)thiolacetate, bromal(tribomoacetaldehyde) reacts with 1-octanethiol to give octal (octylthio) thiolacetate, iodal (triiodoacetaldehyde) reacts with 2-propene-1-thiol to give allyl (allylthio)thiolacetate, dichlorobromacetaldehyde reacts with 2-cyclooctene-1-thiol to give 2-cycloocten-1-yl (2-cycloocten-1-ylthio)thiolacetate, chloral hydrate reacts with benzenethiol to give phenyl (phenylthio)thiolacetate, bromal hydrate reacts with α-toluenethiol to give benzyl (benzylthio)thiolacetate, difluoroacetaldehyde reacts with cyclopentanethiol to give cyclopentyl (cyclopentylthio)thiolacetate, 2,2-dichlorobutyraldehyde reacts with 2-butanethiol to give isobutyl 2-(isobutylthio)thiolbutyrate, 2,2-diiodo-3-butenal reacts with methanethiol to give methyl 2-(methylthio) - 3 - butenethiolate, α-chloro-α-bromocyclohexaneactaldehyde reacts with 2-butene-1-thiol to give 2-butenyl α-(2-butenylthio)cyclohexanethiolacetate, and dichloroacetaldehyde hydrate reacts with 2-cyclohexene-1-thiol to give 2-cyclohexen -1-yl (2-cyclohexene-1-ylthio) thiolacetate. Examples of some thiol esters which can be prepared by the method of this invention are methyl (methylthio)thiolacetate, ethyl (ethylthio)thiolacetate, propyl (propylthio)thiolacetate, isopropyl 2-(isopropylthio)thiolpropionate, isobutyl 2-(isobutylthio)hexanethiolate, hexyl 2 - (hexylthio)-3-butenethiolate, 7-ethyldecyl 2-(7-ethyldecylthio)thiolpalmitate, octadecyl (octadecylthio)thiolacetate, methyl 2-(methylthio)eicosanethiolate, cyclohexyl α-(cyclohexylthio)phenylthiolacetate, cyclopentylmethyl (cyclopentylmethylthio) - triolacetate, 3-methylcyclopentyl (3-methylcyclopentylthio)thiolacetate, allyl α-(allylthio)cyclohexanethiolacetate, 2-methyl-4-hexenyl (2-methyl-4-hexenylthio)thiolacetate, 2-cycloocten-1-yl (2-cycloocten-1-ylthio)thiolacetate, 4-methyl-2-cyclohexen-1-yl (4-methyl-2-cyclohexen-1-ylthio)thiolacetate, phenyl α-(phenylthio)2-cyclohexene-1-thiolacetate, p-tolyl (p-tolylthio)thiolacetate, benzyl (benzylthio)thiolacetate, and 1-naphthyl (1-naphthylthio)thiolacetate.

Generally, any thiol having a monovalent hydrocarbon radical, containing from 1 to 18 carbon atoms, preferably alkyl radicals containing from 1 to 6 carbon atoms, inclusive, can be employed in this invention. Examples of such thiols are methanethiol, ethanethiol, 1-propanethiol, 2-propanethiol, 2-butanethiol, 1-hexanethiol, 7-ethyl-1-decanethiol, 1-octadecanethiol, cyclohexanethiol, cyclopentanemethanethiol, 3-methylcyclopentanethiol, 2-propene-1-thiol, 2-methyl-4-hexene-1-thiol, 2-cyclooctene-1-thiol, 4-methyl-2-cyclohexene-1-thiol, benzenethiol, p-toluenethiol, α-toluenethiol, and 1-naphthalenethiol.

The thiols which can be employed in this invention can be reacted with any of the polyhalo aldehydes or hydrates thereof, which meet the requirements as set forth earlier, to give thiol esters. Examples of some applicable polyhalo aldehyde are fluoral, chloral, bromal, iodal, fluorodichloroacetaldehyde, difluorobromoacetaldehyde, difluoroiodoacetaldehyde, chlorodibromoacetaldehyde, dichloroiodoacetaldehyde, dibromoiodoacetaldehyde, fluorochlorobromoacetaldehyde, chlorobromoiodoacetaldehyde, difluoroacetaldehyde, dichloroacetaldehyde, dibromoacetaldehyde, diiodoacetaldehyde, chlorobromoacetaldehyde, fluoroiodoacetaldehyde, 2-fluoro-2-chloropropionaldehyde, 2,2-dibromodecanal, 2,2-dichloroeicosanal, 2,2-dibromo-3-butenal, α-butenal, α-floro-α-bromocyclohexaneacetaldehyde, α,α-dichloro-3-cyclohexene-1-acetaldehyde, α,α-dibromophenylacetaldehyde, and α,α-dichlorocyclopentanebutyraldehyde. If desired, any of these polyhalo aldehydes can be employed in the hydrate form. Thus, fluoral hydrate, chloral hydrate, bromal hydrate, etc., can be used instead of the free aldehydes listed above.

Although the reaction can be carried out without the use of a solvent, it is preferred that an organic solvent be employed. The solvent should be liquid under the reaction conditions, and it should be essentially inert and non-reactive with the polyhalo aldehyde, thiol, and thiol ester. Among the solvents which can be employed are included hydrocarbons such as pentane, hexane, octane, methylcyclopentane, cyclohexane, benzene, and toluene, and amides such as N,N-dimethylformamide, N,N-diethylformamide, N,N-dimethylacetamide, N,N-diethylacetamide, N-methyl-N-ethylacetamide, N-methyl-N-phenylformamide, N-ethyl-N-phenylacetamide, N-methylcaprolactam, and 1-methyl-2-pyrrolidinone. Preferred are aromatics having from 6 to 9 carbon atoms per molecule and cyclic and acyclic amides having from 3 to 6 carbon atoms per molecule, both inclusive.

Although the reactants can be employed over a wide range of ratios, the ratio of thiol to polyhalo aldehyde should fall in the range of from about 2:1 to about 10:1, preferably from about 3:1 to about 6:1. The reaction time can vary from about 1 minute to about 24 hours, usually falling in the range of from about 5 minutes to about 5 hours, depending on the reactivity of the reactants and the temperature employed.

The temperature of reaction for the trihalo aldehyde will be from about 150 to about 300° C., preferably from 180 to 250° C. The temperature of reaction for the dihalo aldehyde will be in the range of from about 20 to about 300° C., preferably from 30 to 250° C. The reaction pressure need be only that required to maintain the reactants substantially in the liquid phase.

The thiol esters prepared by the method of this invention and particularly butyl(butylthio)thiolacetate have utility a soil-soluble complexing agents, e.g., as additives in hydrocarbons such as oil, kerosene, gasoline, and the like. They also have utility as drilling fluid additives and as chemical intermediates, particularly in the production of agricultural chemicals.

The following examples will further illustrate the invention, although it is not intended that the invention be limited thereto.

*Example I*

A mixture of 42 g. (0.285 mole) of chloral and 130 g. (1.44 moles) of 1-butanethiol in 300 ml. of 1-methyl-2-pyrrolidinone was heated in a 1-liter stirred autoclave at 210° C. for 4 hours. The mixture was then cooled and diluted with three parts of water. The organic layer was separated, and the aqueous layer was extracted twice with ether. The organic layers were combined and dried over anhydrous magnesium sulfate. After filtration of the drying agent and removal of the solvent, the product was distilled to give, in addition to some butyldisulfide, 13.5 g. (22 mole percent yield) of butyl (butylthio)thiolacetate, $C_{10}H_{20}S_2O$, boiling at 94° C./0.2 mm., $n_D^{20}$ 1.5000. The infrared spectrum of this ester was consistent with that to be expected for butyl (butylthio)thiolacetate, having a strong absorption band at 3.4 microns which indicates a CH group in an alkyl radical, a strong band at 6.0 microns which indicates a C=O group; a strong band at 6.8 microns which indicates a $CH_2$ group in an alkyl radical, a strong band at 7.2 microns which indicates $CH_2+CH_3$ groups in an alkyl radical, a strong band at 9.8 microns and a medium band at 13.4 microns both of which indicate a n—$C_4H_9$ group and a weak band at 11.4 microns and a medium band at 12.6 microns both of which indicate a C—S group.

It is clear from the above that an aldehyde is not present due to the complete absence of bands at 3.7 and 5.7 microns which indicate a C=O group in a

radical.

*Analysis.*—Calculated for $C_{10}H_{20}S_2O$: C, 54.5; H, 9.1; S, 29.1; mol. wt., 220. Found: C, 54.4; H, 9.2; S, 28.5; mol. wt., 217 (by osometry). This indicates that the product of the method of Example I was butyl (butylthio)thiolacetate.

The product of the method of Example I was contacted with 2,4-dinitrophenylhydrazine; no 2,4-dinitrophenylhydrazone was formed which indicates that neither an aldehydic nor ketonic structure was present.

*Example II*

Another reaction was carried out by the procedure in Example I except that benzene was used as the solvent. A mixture at 42 g. (0.285 mole) of chloral and 130 g. (1.44 moles) of 1-butanethiol in 300 ml. of benzene was heated in a 1-liter stirred autoclave at 210° C. for 4 hours. The mixture was then cooled, and the solvent was removed by distillation. Distillation of the product gave, in addition to some butyl disulfide, 19.2 g. (31.5 mole percent yield) of butyl (butylthio)thiolacetate boiling at 113° C./1.4 mm., $n_D^{20}$ 1.5040. The product was identical to that obtained in Example I, as determined by gas chromatography. That the product was identical to that obtained in Example I was further verified by elemental analysis (C, 54.8; H, 9.5; S, 28.8) and molecular weight determination by osometry (mol. wt., 219).

Thus, the method of Example II also indicates that the product thereof was butyl (butylthio)thiolacetate.

*Example III*

A mixture of 48.5 g. (0.33 mole) of chloral and 130 g. (1.44 moles) of 1-butanethiol in 300 ml. of benzene was heated in a 1-liter stirred autoclave at 60–70° C. for 7 hours. The reaction mixture was then concentrated on a steam bath. From the cooled concentrated mixture was filtered 75 g. (96 mole percent yield) of the butyl hemimercaptal of chloral, $C_6H_{11}Cl_3OS$.

*Analysis.*—Calculated for $C_6H_{11}Cl_3OS$: C, 30.3; H, 4.6; Cl, 44.8; S, 13.5, mol. wt., 237.5. Found: C, 30.4; H, 4.7; Cl, 44.6; S, 13.1; mol. wt., 232 (by osometry). Thus, the reaction of chloral with 1-butanethiol at the relatively low temperature of 60–70° C. did not give the desired butyl (butylthio)thiolacetate.

*Example IV*

A mixture of 39 g. (0.346 mole) of dichloroacetaldehyde and 130 g. (1.44 moles) of 1-butanethiol in 300 ml.

of benzene was heated in a 1-liter stirred autoclave at 210° C. for 4 hours. The reaction mixture was then cooled and filtered, and the filtrate was concentrated on a steam bath. Gas chromatographic analysis of the concentrated filtrate showed that butyl (butylthio)-thiolacetate was produced in a yield of 31.2 mole percent. Butyl disulfide in a yield of 68.2 mole percent was also produced. The identity of both products was determined by comparison with authentic specimens through the use of gas chromatography in which it was found that the retention time of the product of the method of this example was substantially the same as that of the authentic specimen of butyl (butylthio)thiolacetate when the product and specimen were mixed and injected simultaneously into the same chromatographic column. Thus, dichloroacetaldehyde was used successfully as a substitute for chloral in the production of butyl (butylthio)thiolacetate.

*Example V*

A mixture of 78 g. (0.692 mole) of dichloroacetaldehyde and 250 g. (2.78 moles) of 1-butanethiol in 500 ml. of benzene was heated in a 1-liter stirred autoclave at 80° C. for 4 hours. The reaction mixture was then concentrated on a steam bath. Gas chromatographic analysis of the concentrated mixture showed that butyl (butylthio)thiolacetate was produced in a yield of 27.5 mole percent. Butyl disulfide in a 10.3 mole percent yield and the dibutyl mercaptal of (butylthio)acetaldehyde in a 2.1 mole percent yield were produced as by-products, as determined by gas chromatographic analysis. The identity of all three products was determined by comparison with authentic samples through the use of gas chromatography, in which it was found that the retention time of the product of the method of this example was substantially the same as that of the authentic specimen of butyl (butylthio)thiolacetate when the product and specimen were mixed and injected simultaneously into the same chromatographic column. Thus, butyl (butylthio)thiolacetate was produced from dichloroacetaldehyde and 1-butanethiol at the relatively low temperature of 80° C.

Reasonable variations and modifications are possible within the scope of this disclosure without departing from the spirit and scope of the invention.

I claim:

1. Butyl (butylthio)thiolacetate.
2. A method for preparing a thiol ester having a sulfide linkage alpha to the ester group comprising contacting a thiol of the formula RSH, wherein R is a monovalent hydrocarbon radical containing from 1 to 18 carbon atoms and selected from the group consisting of alkyl, cycloalkyl, alkenyl, cycloalkenyl, aryl, and combinations thereof, with a compound selected from the group consisting of a polyhalo aldehyde of the formula $R^2CX_2CHO$, where X is a halogen selected from at least one of the group consisting of fluorine, chlorine, bromine, and iodine, $R^2$ is a substituent selected from the group consisting of R as defined for the thiol above, hydrogen, and X, the contacting being carried out under a pressure sufficient to keep the reactants substantially liquid and when the polyhalo aldehyde is a dihalo aldehyde at a temperature of from 30 to 250° C. and when the polyhalo aldehyde is a trihalo aldehyde at a temperature of from 180 to 250° C.
3. The method of claim 2 wherein said aldehyde is employed in the hydrate form and the contacting takes place in the presence of an organic solvent.
4. A method for preparing a thiol ester having a sulfide linkage alpha to the ester group comprising contacting a thiol of the formula RSH wherein R is a monovalent hydrocarbon radical containing from 1 to 18 carbon atoms and is selected from the group consisting of alkyl, cycloalkyl, alkenyl, cycloalkenyl, aryl and combinations thereof, with a dihalo aldehyde of the formula $R^2CX_2CHO$ wherein $R^2$ is defined as R of the thiol above and X is a halogen selected from at least one of the group consisting of fluorine, chlorine, bromine, and iodine, the contacting being carried out under pressures sufficient to keep the reactants substantially liquid and at a temperature of from about 20 to about 300° C.
5. A method for preparing a thiol ester having a sulfide linkage alpha to the ester group comprising contacting a thiol of the formula RSH wherein R is a monovalent hydrocarbon radical containing from 1 to 18 carbon atoms and is selected from the group consisting of alkyl, cycloalkyl, alkenyl, cycloalkenyl, aryl and combinations thereof, with a dihalo aldehyde of the formula $R^2CX_2CHO$ wherein $R^2$ is hydrogen and X is a halogen selected from at least one of the group consisting of fluorine, chlorine, bromine, and iodine, the contacting being carried out under pressures sufficient to keep the reactants substantially liquid and at a temperature of from about 20 to about 300° C.
6. The method of claim 5 wherein R is a monovalent alkyl hydrocarbon radical containing from 1 to 6 carbon atoms, X is chlorine, and the temperature is from about 30 to about 250° C.
7. The method according to claim 5 wherein R is a monovalent alkyl hydrocarbon radical containing from 1 to 6 carbon atoms, X is bromine, and the temperature is from about 30 to about 250° C.
8. A method for producing butyl (butylthio)thiolacetate comprising contacting dichloroacetaldehyde with 1-butanethiol in the presence of benzene under pressure sufficient to keep the reactants substantially liquid and at about 80° C.
9. A method for producing butyl (butylthio)thiolacetate comprising contacting dichloroacetaldehyde with 1-butanethiol in the presence of benzene under pressure sufficient to keep the reactants substantially liquid and at about 210° C.
10. A method for preparing a thiol ester having a sulfide linkage alpha to the ester group comprising contacting a thiol of the formula RSH wherein R is a monovalent alkyl hydrocarbon radical containing from 1 to 6 carbon atoms, with trihalo aldehyde wherein the halogen is selected from at least one of the group consisting of fluorine, chlorine, bromine, and iodine, the contacting being carried out under pressures sufficient to keep the reactants substantially liquid and at a temperature of from about 180 to about 250° C.
11. The method of claim 9 wherein the thiol is 1-butanethiol, the solvent is benzene and the temperature is about 210° C.
12. A method of making a thiol ester having a sulfide linkage alpha to the ester group comprising contacting a thiol of the formula RSH where R is a monovalent alkyl hydrocarbon radical containing from 1 to 6 carbon atoms with chloral in the presence of a solvent selected from the group consisting of aromatics having from 6 to 9 carbon atoms per molecule and cyclic and acyclic amides having from 3 to 6 carbon atoms per molecule under a pressure sufficient to keep the reactants substantially liquid and at a temperature in the range of from about 180 to 250° C.
13. A method according to claim 12 wherein the thiol is 1-butanethiol, the solvent is 1-methyl-2-pyrrolidinone and the temperature is about 210° C.
14. A method of preparing a thiol ester having a sulfide linkage alpha to the ester group comprising contacting a thiol with a compound selected from the group consisting of dihalo aldehydes and trihalo aldehydes, the contacting being carried out under a pressure sufficient to keep the reactants substantially liquid and when the compound is dihalo aldehyde at a temperature of from about 20 to about 300° C. and when the compound is trihalo aldehyde at a temperature of from about 150 to about 300° C.

No references cited.

CHARLES B. PARKER, *Primary Examiner.*
BERNARD BILLIAN, *Assistant Examiner.*